United States Patent
Hu et al.

(10) Patent No.: US 7,251,929 B2
(45) Date of Patent: Aug. 7, 2007

(54) THERMAL MANAGEMENT OF HYBRID LNT/SCR AFTERTREATMENT DURING DESULFATION

(75) Inventors: Haoran Hu, Novi, MI (US); James Edward McCarthy, Jr., Canton, MI (US); Jiyang Yan, Troy, MI (US)

(73) Assignee: Eaton Corporation, Cleveland, OH (US)

( * ) Notice: Subject to any disclaimer, the term of this patent is extended or adjusted under 35 U.S.C. 154(b) by 0 days.

(21) Appl. No.: 11/176,710

(22) Filed: Jul. 7, 2005

(65) Prior Publication Data

US 2007/0006573 A1 Jan. 11, 2007

(51) Int. Cl.
 *F01N 3/00* (2006.01)
(52) U.S. Cl. .............................. 60/285; 60/286; 60/288
(58) Field of Classification Search .................. 60/285, 60/295, 297, 301, 311
See application file for complete search history.

(56) References Cited

U.S. PATENT DOCUMENTS

| | | | | |
|---|---|---|---|---|
| 3,981,145 | A * | 9/1976 | Noguchi et al. | 60/288 |
| 5,211,012 | A * | 5/1993 | Swars | 60/295 |
| 5,402,641 | A * | 4/1995 | Katoh et al. | 60/301 |
| 5,974,793 | A | 11/1999 | Kingusa et al. | |
| 6,109,024 | A | 8/2000 | Kingusa et al. | |
| 6,161,378 | A | 12/2000 | Hanaoka et al. | |
| 6,176,079 | B1 | 1/2001 | Konrad et al. | |
| 6,182,443 | B1 * | 2/2001 | Jarvis et al. | 60/274 |
| 6,357,226 | B2 * | 3/2002 | Borland | 60/298 |
| 6,530,216 | B2 | 3/2003 | Pott | |
| 6,718,753 | B2 * | 4/2004 | Bromberg et al. | 60/275 |
| 6,732,507 | B1 * | 5/2004 | Stanglmaier et al. | 60/285 |
| 6,766,642 | B2 | 7/2004 | Binder et al. | |
| 6,820,417 | B2 | 11/2004 | May et al. | |
| 6,835,689 | B1 | 12/2004 | He et al. | |
| 6,845,612 | B2 * | 1/2005 | Jobson et al. | 60/301 |
| 6,863,874 | B1 | 3/2005 | Twigg | |

(Continued)

FOREIGN PATENT DOCUMENTS

WO   WO 2004/061278 A1   7/2004

(Continued)

OTHER PUBLICATIONS

Hakim et al., NOx Adsorbers for Heavy Duty Truck Engines—Testing and Simulation.

*Primary Examiner*—Thomas Denion
*Assistant Examiner*—Loren Edwards
(74) *Attorney, Agent, or Firm*—Paul V. Keller

(57) ABSTRACT

In an exhaust aftertreatment system comprising a NOx adsorber-catalyst followed by an SCR catalyst, means are provided for preventing the SCR catalyst from becoming heated to near the same peak temperatures as the NOx adsorber-catalyst during desulfation. In one embodiment, the means is a thermal mass between the NOx adsorber-catalyst and the SCR catalyst. In another embodiment, the means is a valve configured to selectively divert exhaust leaving the NOx adsorber-catalyst from the SCR catalyst. In a method of the invention, the NOx adsorber-catalyst temperature is cycled during desulfation. The peaks of the cycles are within an appropriate temperature range for desulfating the NOx adsorber-catalyst, but the average temperature is below the temperature range at which the SCR catalyst is damaged. The temperature peaks are damped as they travel from the NOx adsorber-catalyst to the SCR, whereby the SCR experiences much lower peak temperatures than the NOx adsorber-catalyst.

6 Claims, 2 Drawing Sheets

U.S. PATENT DOCUMENTS

| | | | |
|---|---|---|---|
| 6,871,489 B2 * | 3/2005 | Tumati et al. | 60/285 |
| 6,871,490 B2 * | 3/2005 | Liang et al. | 60/286 |
| 7,082,753 B2 * | 8/2006 | Dalla Betta et al. | 60/286 |
| 7,117,669 B2 * | 10/2006 | Kaboord et al. | 60/288 |
| 2003/0101713 A1 | 6/2003 | Dalla Betta et al. | |
| 2004/0050037 A1 | 3/2004 | Betta et al. | |
| 2004/0076565 A1 | 4/2004 | Gandhi et al. | |
| 2004/0175315 A1 | 9/2004 | Brisley et al. | |
| 2005/0129601 A1 | 6/2005 | Li et al. | |
| 2006/0010857 A1 * | 1/2006 | Hu et al. | 60/286 |

FOREIGN PATENT DOCUMENTS

| | | |
|---|---|---|
| WO | WO 2004/090296 A1 | 10/2004 |
| WO | WO 2005/014146 A1 | 2/2005 |

* cited by examiner

THERMAL MANAGEMENT OF HYBRID LNT/SCR AFTERTREATMENT DURING DESULFATION

FIELD OF THE INVENTION

The present invention relates to pollution control devices for diesel engines, and lean-burn gasoline engines.

BACKGROUND OF THE INVENTION $NO_x$ emissions from diesel engines are an environmental problem. Several countries, including the United States, have long had regulations pending that will limit $NO_x$ emissions from trucks and other diesel-powered vehicles. Manufacturers and researchers have already put considerable effort toward meeting those regulations.

In gasoline powered vehicles that use stoichiometric fuel-air mixtures, three-way catalysts have been shown to control $NO_x$ emissions. In diesel-powered vehicles, which use compression ignition, the exhaust is generally too oxygen-rich for three-way catalysts to be effective.

Several solutions have been proposed for controlling NOx emissions from diesel-powered vehicles. One set of approaches focuses on the engine. Techniques such as exhaust gas recirculation and partially homogenizing fuel-air mixtures are helpful, but these techniques alone will not eliminate NOx emissions. Another set of approaches remove NOx from the vehicle exhaust. These include the use of lean-burn $NO_x$ catalysts, selective catalytic reduction (SCR), and lean $NO_x$ traps (NOx adsorber-catalysts).

Lean-burn NOx catalysts promote the reduction of $NO_x$ under oxygen-rich conditions. Reduction of NOx in an oxidizing atmosphere is difficult. It has proved challenging to find a lean-burn $NO_x$ catalyst that has the required activity, durability, and operating temperature range. Lean-burn $NO_x$ catalysts also tend to be hydrothermally unstable. A noticeable loss of activity occurs after relatively little use. Lean-burn NOx catalysts typically employ a zeolite wash coat, which is thought to provide a reducing microenvironment. The introduction of a reductant, such as diesel fuel, into the exhaust is generally required and introduces a fuel economy penalty of 3% or more. Currently, peak NOx conversion efficiencies for lean-burn catalysts are unacceptably low.

SCR refers to selective catalytic reduction of NOx by ammonia. The reaction takes place even in an oxidizing environment. The NOx can be temporarily stored in an adsorbant or ammonia can be fed continuously into the exhaust. SCR can achieve high levels of NOx reduction, but there is a disadvantage in the lack of infrastructure for distributing ammonia or a suitable precursor. Another concern relates to the possible release of ammonia into the environment.

NOx adsorber-catalysts are NOx adsorbers combined with catalysts for NOx reduction. The adsorbant is typically an alkaline earth oxide adsorbant, such as $BaCO_3$ and the catalyst is typically a precious metal, such as Pt or Ru. In lean exhaust, the catalyst speeds oxidizing reactions that lead to NOx adsorption. Accumulated NOx is removed by creating a rich environment within the NOx adsorber-catalyst through the introduction of a reductant. In a rich environment, the catalyst activates reactions by which adsorbed NOx is reduced and desorbed, preferably as $N_2$. The process of removing accumulated NOx from the NOx adsorber-catalyst is commonly referred to as regeneration, although it may also be referred to as denitration in order to distinguish desulfation, described below.

In addition to accumulating NOx, NOx adsorber-catalysts accumulate SOx. SOx is the combustion product of sulfur present in ordinarily diesel fuel. Even with reduced sulfur fuels, the amount of SOx produced by diesel combustion is significant. SOx adsorbs more strongly than NOx and necessitates a more stringent, though less frequent, regeneration. Desulfation requires elevated temperatures as well as a reducing atmosphere.

The conditions for denitration may be created in several ways. One approach uses the engine to create a rich fuel-air mixture. This may be accomplished, for example, by injecting extra diesel fuel into one or more engine cylinders after combustion and substantial decompression. Reductant may also be injected into the exhaust downstream of the engine. In either case, a portion of the reductant must be expended to consume oxygen in the exhaust. The reductant can consume oxygen either by reactions in the NOx adsorber-catalyst or by reactions in an upstream unit. For example, U.S. Patent Pub. No. 2003/0101713 describes an exhaust system with a fuel reformer placed inline with the exhaust and upstream of a NOx adsorber-catalyst. The fuel reformer not only consumes excess oxygen, but converts diesel fuel into more reactive reformate.

It is known that a NOx adsorber-catalyst can produce ammonia during denitration and from this knowledge it has been proposed to combine a NOx adsorber-catalyst and a SCR catalyst into one system. Ammonia produced by the NOx adsorber-catalyst during regeneration is captured in a downstream SCR catalyst for subsequent use in reducing NOx, thereby improving conversion efficiency over a stand-alone NOx adsorber-catalyst with no increase in fuel penalty or precious metal usage. U.S. Pat. No. 6,732,507 describes such a system. U.S. Patent Pub. No. 2004/0076565 describes such a system wherein both components are encased by a single shell or disbursed over one substrate. WO 2004/090296 describes such a system with an inline reformer upstream of the NOx adsorber-catalyst, U.S. Patent Pub. No. 2004/0101713 suggests that an inline reformer can overheat a downstream NOx adsorber-catalyst. Accordingly, that publication proposes a device providing a thermal mass placed between the reformer and the NOx adsorber-catalyst to prevent such overheating. The device can be a particulate filter.

U.S. Patent Pub. No. 2004/0050037 proposes a method of regulating the temperature of a NOx adsorber-catalyst downstream of a reformer during desulfation. According to this method, a reductant flow is pulsed. In between pulses, the NOx adsorber-catalyst is allowed to cool to prevent overheating.

In spite of advances, there continues to be a long felt need for an affordable and reliable exhaust treatment system that is durable, has a manageable operating cost, and can practically be used to reduce NOx emissions across the spectrum of diesel engines to a satisfactory extent in the sense of meeting U.S. Environmental Protection Agency (EPA) regulations effective in 2010 and other such regulations.

SUMMARY OF THE INVENTION

The inventors believe that commonly used SCR catalysts can be damaged by repeated exposure to temperatures used in desulfating NOx adsorber-catalysts. Accordingly, one of the inventors' concepts relates to an exhaust aftertreatment system comprising a NOx adsorber-catalyst, an SCR catalyst, and means for preventing the SCR catalyst from becoming heated to near the same peak temperatures as the NOx adsorber-catalyst during desulfation. The system generally further comprises a particulate filter located either upstream of the NOx adsorber-catalyst or downstream of the SCR catalyst.

In one embodiment, the means for preventing the SCR catalyst from becoming heated to near the same peak temperatures as the NOx adsorber-catalyst during desulfation comprises a device that provides a thermal mass between the NOx adsorber-catalyst and the SCR catalyst. In this embodiment, the device is not a particulate filter, an oxidation catalyst, a SCR catalyst, nor a NOx adsorber-catalyst. The device is functional to substantially dampen temperature pulses transmitted to the NOx adsorber-catalyst through the exhaust, whereby the temperature pulses are attenuated and have substantially lower peaks when they reach the SCR catalyst.

In another embodiment, the means for preventing the SCR catalyst from becoming heated to near the same peak temperatures as the NOx adsorber-catalyst during desulfation comprises a flow diverter, such as a valve, configured to selectively divert exhaust leaving the NOx adsorber-catalyst, whereby the exhaust does not enter the SCR catalyst.

Another of the inventors' concepts relates to a method of desulfating a NOx adsorber-catalyst upstream of an SCR catalyst. The method comprises cycling the NOx adsorber-catalyst temperature. The peaks of the cycles are within an appropriate temperature range for desulfating the NOx adsorber-catalyst, but the average temperature is below the temperature range at which the SCR catalyst is damaged. The temperature peaks are damped as they travel from the NOx adsorber-catalyst to the SCR, whereby the SCR experiences much lower peak temperatures than the NOx adsorber-catalyst. Damping may be facilitated by a device between the NOx adsorber-catalyst and the SCR, such as DPF or an inert thermal mass.

The primary purpose of this summary has been to present certain elements of the inventors' concepts in a simplified form to facilitate understanding of the more detailed description that follows. This summary is not a comprehensive description of every one of the inventors' concepts or every combination of the inventors' concepts that can be considered "invention". Other concepts of the inventors will become apparent to one of ordinary skill in the art from the following detailed description and annexed drawings. The concepts disclosed herein may be generalized, narrowed, or combined in various ways with the ultimate statement of what the inventors claim as their invention being reserved for the claims that follow.

DETAILED DESCRIPTION OF THE INVENTION

Figure 1:
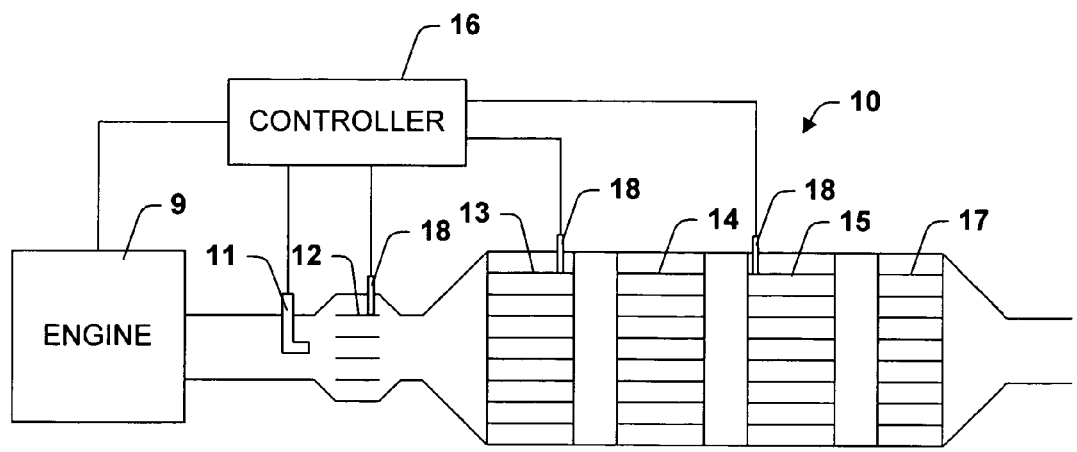
FIG. 1 is a schematic illustration of a first exemplary system to which various concepts of the inventors can be applied.

FIG. 1 is a schematic illustration of an exemplary exhaust aftertreatment system 10 conceived by the inventors. The system 10 comprises a fuel injection port 11, an inline reformer 12, a NOx adsorber-catalyst 13, a thermal mass 14, a diesel particulate filter 15, a clean-up oxidation catalyst 17, temperature sensors 18, and a controller 16. The system 10 processes a NOx-containing exhaust from an engine 9.

The engine 9 is preferably a compression ignition diesel engine, although the invention is applicable to aftertreatment systems for other NOx-containing, oxygen-rich exhausts. For purposes of the present disclosure, NOx consists of NO and $NO_2$.

An exhaust aftertreatment system can use any suitable reductant. The reductant is either provided through the engine 9 or injected into the exhaust, through the fuel injector 11 for example. Where the reductant is diesel fuel, the reductant preferably undergoes reforming prior to reaching the NOx adsorber-catalyst 13. Reforming can take place in the exhaust stream, in a partial exhaust stream, or outside the exhaust stream. In the example of FIG. 1, reforming takes place in the exhaust stream.

In addition to reducing NOx, the reductant generally consumes excess oxygen in the exhaust. Oxygen can be consumed by an inline reformer 12 or other exhaust system catalyst. Typically, the NOx adsorber-catalyst 13 has a catalyst suitable for reaction between the reductant and oxygen to consume excess oxygen, although consuming oxygen in this way often has the disadvantage of causing undesirably high temperatures and temperature gradients in the NOx adsorber-catalyst 13.

Examples of suitable reductants include CO, $H_2$, $NH_3$, gasoline, diesel fuel, and reformed gasoline or diesel fuel (reformate). In the exhaust treatment system 10, the reductant is diesel fuel injected by the fuel injector 11 and processed through the inline reformer 12 to produce reformate.

A fuel reformer is a device that converts heavier fuels into lighter compounds without fully combusting the fuel. A fuel reformer can be a catalytic reformer, a steam reformer, an autothermal reformer, or a plasma reformer. Preferably, the reformer 12 is a partial oxidation catalytic reformer. A partial oxidation catalytic reformer comprises a reformer catalyst. Examples of reformer catalysts include precious metals, such as Pt, Pd, or Ru, and oxides of Al, Mg, and Ni, the later group being typically combined with one or more of CaO, $K_2O$, and a rare earth metal such as Ce to increase activity. A reformer is preferably small in size as compared to an oxidation catalyst or a three-way catalyst designed to perform its primary functions at temperatures below 500° C. A partial oxidation catalytic reformer is generally operative at temperatures from about 650 to about 850° C.

The NOx adsorber-catalyst 13 can comprise any suitable NOx-adsorbing material. Examples of NOx adsorbing materials include oxides, carbonates, and hydroxides of alkaline earth metals such as Mg, Ca, Sr, and Be or alkali metals such as K or Ce. Further examples of NOx-adsorbing materials include molecular sieves, such as zeolites, alumina, silica, and activated carbon. Still further examples include metal phosphates, such as phosphates of titanium and zirconium. Generally, the NOx-adsorbing material is an alkaline earth oxide.

The NOx adsorber-catalyst 13 also has a catalyst for the reduction of NOx in a reducing environment. The catalyst can be, for example, one or more precious metals, such as Au, Ag, and Cu, group VIII metals, such as Pt, Pd, Ru, Ni, and Co, Cr, Mo, or K. A typical catalyst includes Pt and Rh, although it may be desirable to reduce or eliminate the Rh to favor the production of $NH_3$ over $N_2$. Precious metal catalysts also facilitate the adsorbant function of alkaline earth oxide adsorbers. A typical effective operating temperature for a NOx adsorber-catalyst is in the range from about 300 to about 450° C. An adsorbant is typically combined with a binder and either formed into a self-supporting structure or applied as a coating over an inert substrate.

Adsorbant and catalysts according to the present invention are generally adapted for use in vehicle exhaust systems. Vehicle exhaust systems create restriction on weight, dimensions, and durability. For example, a NOx adsorbant bed for a vehicle exhaust systems must be reasonably resistant to degradation under the vibrations encountered during vehicle operation.

An adsorbant bed or catalyst brick can have any suitable structure. Examples of suitable structures may include monoliths, packed beds, and layered screening. A packed bed is preferably formed into a cohesive mass by sintering the particles or adhering them with a binder. When the bed has an adsorbant function, preferably any thick walls, large particles, or thick coatings have a macro-porous structure facilitating access to micro-pores where adsorption occurs. A macro-porous structure can be developed by forming the walls, particles, or coatings from small particles of adsorbant sintered together or held together with a binder.

The NOx adsorber-catalyst 13 comprises a catalyst for the reduction of NOx in a reducing environment. The catalyst can be, for example, one or more precious metals, such as Au, Ag, and Cu, group VIII metals, such as Pt, Pd, Ru, Ni, and Co, Cr, Mo, or K. A typical catalyst includes Pt and Rh, although it may be desirable to reduce or eliminate the Rh to favor the production of $NH_3$ over $N_2$. Effective operating temperatures are generally in the range from about 200 to about 450° C.

From time-to-time, the NOx adsorber-catalyst 13 requires desulfation. The need for desulfation is indicated, for example, by a loss of adsorbant activity that cannot be recovered by denitration. Desulfation involves heating the NOx adsorber-catalyst 13. The NOx adsorber-catalyst 13 can be heated in any suitable fashion. Typically, the NOx adsorber-catalyst 13 is heated by oxidizing reductant in the exhaust. The reductant can be oxidized in the NOx adsorber-catalyst 13, or in an upstream unit such as the reformer 12. Heating can also be achieved or facilitated through operation of the engine 9.

A typical desulfation temperature is at least about 650° C. In some cases, a minimum desulfation temperature in the range from about 670° C. to about 710° C. is specified. Typically, there is also a maximum desulfation temperature, about 750° C. for example. Above this temperature, the NOx adsorber-catalyst 13 is likely to suffer excessive thermal aging.

In general, a thermal mass can be any device that contacts the exhaust and provides thermal inertia between the NOx adsorber-catalyst 13 and the SCR catalyst 15. Because the SCR catalyst 15 lies downstream of the adsorber-catalyst 13, temperature pulses transmitted by the exhaust are damped when the reach the SCR catalyst 15. The thermal mass 14 is functional to substantially increase the degree of damping, whereby the temperature pulses reaching the SCR catalyst 15 are further attenuated and have substantially lower peaks than they would have in the absence of the thermal mass 14.

Figure 2:
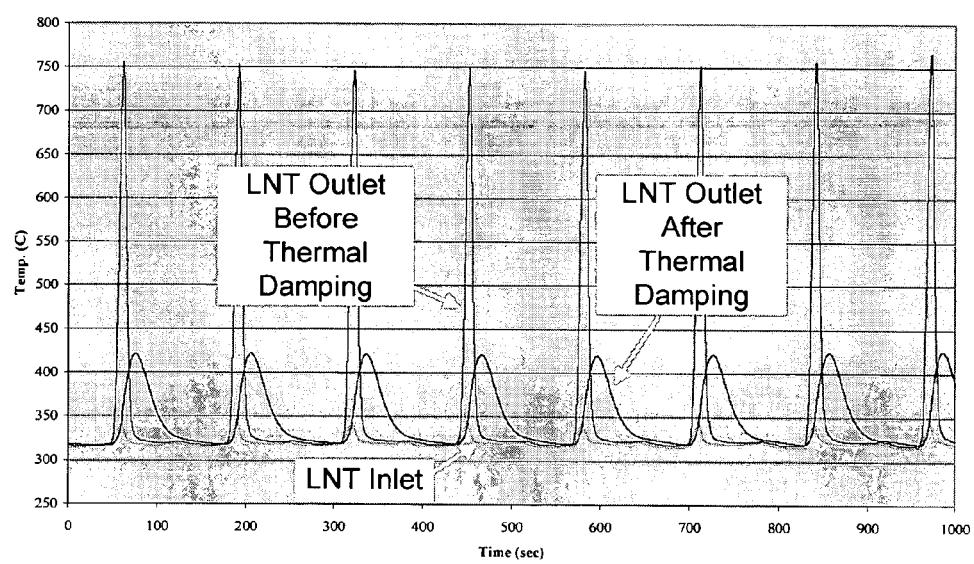
FIG. 2 is a plot of simulation results showing temperatures as a function of time at various points in an exhaust aftertreatment system undergoing desulfation.

FIG. 2 plots the results of a computer simulation illustrating thermal damping by a thermal mass. FIG. 2 plots the temperature of exhaust supplied to an NOx adsorber-catalyst, the outlet temperature of the NOx adsorber-catalyst, and the outlet temperature of a thermal mass. The temperature of the exhaust entering the NOx adsorber-catalyst is steady and relatively low. The exhaust becomes heated in the NOx adsorber-catalyst by combustion of reductant pulses. The resulting temperature pulses are transmitted downstream by the exhaust. By the time the temperature pulses leave the thermal mass they have widened and have much lower peaks.

A thermal mass can have any suitable structure. In one embodiment, the thermal mass can be a catalyst or a filter. In another embodiment, the thermal mass can be a catalyst, but is not a filter, an oxidation catalyst, a SCR catalyst, nor a NOx adsorber-catalyst. In a further embodiment, the thermal mass is inert, as in an un-coated monolith substrate. In a still further embodiment, the device 14 is not a particulate filter, but a particulate filter is located elsewhere in the system 10. Examples of other locations include upstream of the adsorber-catalyst 13 and downstream of the SCR catalyst 15. Further options include integrating the particulate filter with the adsorber-catalyst 13 or the SCR catalyst 15.

The SCR catalyst 15 is a catalyst effective to catalyze reactions between NOx and $NH_3$ to reduce NOx to $N_2$ in lean exhaust. Examples of SCR catalysts include oxides of metals such as Cu, Zn, V, Cr, Al, Ti, Mn, Co, Fe, Ni, Pd, Pt, Rh, Rd, Mo, W, and Ce, zeolites, such as ZSM-5 or ZSM-11, substituted with metal ions such as cations of Cu, Co, Ag, Zn, or Pt, and activated carbon. Reaction can be obtained at relatively low temperatures, for example, temperatures in the range from about 230 to about 450° C. Exposure to high temperatures, above 550° C. for a typical SCR catalyst, can cause permanent loss of catalyst activity.

The SCR catalyst 15 is generally carried by a separate brick (support) downstream of the NOx adsorber-catalyst 13, although optionally the NOx adsorber-catalyst 13, the SCR catalyst 15, and the thermal mass 14 are provided on a single substrate. Providing devices on separate bricks facilitates maintaining temperature differences.

The clean-up oxidation catalyst 17 is preferably functional to oxidize unburned hydrocarbons from the engine 9, unused reductants, and any $H_2S$ released from the NOx adsorber-catalyst 13 and not oxidized by the SCR catalyst 15. Any suitable oxidation catalyst can be used. A typical oxidation catalyst is a precious metal, such as platinum. To allow the clean-up catalyst 17 to function under rich conditions, the catalyst may include an oxygen-storing component, such as ceria. Removal of $H_2S$, where required, may be facilitated by one or more additional components such as NiO, $Fe_2O3$, $MnO_2$, CoO, and $CrO_2$.

One of the inventors' concepts is a method of desulfating an NOx adsorber-catalyst in an NOx adsorber-catalyst-SCR system. According to the method, the temperature of the NOx adsorber-catalyst is cycled. The temperature cycles are such that the peak temperatures of the cycles are within the range at which desulfation of the NOx adsorber-catalyst can occur.

The exhaust and the components of the aftertreatment system interact, whereby the temperature cycles propagate in the direction the exhaust flows and become damped as the exhaust travels downstream. The damping is to a degree that the SCR catalyst does not experience the temperatures at which desulfation can occur or at which the SCR catalyst undergoes significant activity loss. This goal is facilitated by an average NOx adsorber-catalyst temperature over the cycle that is below the maximum temperature for the SCR catalyst. Preferably, the peak NOx adsorber-catalyst temperature is at least about 650° C., more preferably at least about 670° C., still more preferably at least about 710° C. Preferably the average NOx adsorber-catalyst temperature is at or below about 550° C. Preferably, the average NOx adsorber-catalyst temperature is at least about 100° C. below the peak exhaust temperature over the cycle, more preferably at least about 150° C. over, still more preferably at least about 200° C. over.

The cycle lengths and other parameters can be determined in any suitable fashion. In one embodiment, the cycle length is fixed. In another embodiment, the cycle length is determined by feedback control. Feedback control is based on reading from one or more temperature sensor 18, which are typically thermocouples. The temperature sensors 18 can have any suitable locations. Suitable locations include without limitation, upstream of the NOx adsorber catalyst, near the inlet side of the NOx adsorber catalyst, near the outlet side of the NOx adsorber catalyst, between the NOx adsorber catalyst an the SCR catalyst, or near the inlet side of the SCR catalyst. The reformer temperature is generally measured for other purposes and can be useful in an SCR catalyst temperature control system.

In a preferred embodiment, the control system comprises feedback control using just one temperature sensor downstream of the reformer. A preferred location of this temperature sensor is in contact with the NOx adsorber catalyst, preferably near the inlet side. The control system can map the temperature sensor data to peak temperatures occurring in the SCR catalyst at a later time. The map may take into account additional variables, such as the exhaust flow rate and the temperature of the exhaust as it enters the adsorber-catalyst. Optionally, the temperature of the exhaust as it enters the adsorber-catalyst is inferred from the rate of change of the measured adsorber-catalyst temperature, although it may be more practical to measure the exhaust temperature directly or determine it from the reformer temperature.

Essentially, a mapping function is a mathematical model that relates the measured data to the temperatures that will occur subsequently in the SCR catalyst. These future temperatures also depend on future exhaust flow rates and temperatures. If an excessive SCR catalyst temperature is predicted, the fuel supply will be cut off; therefore the model will generally operate under the assumption the fuel supply will be cut off in the next instant. With regard to the future exhaust temperatures and flow rates, the model can assume worst case scenarios, e.g., a peak exhaust temperature that can occur as a result of normal engine operation with the reformer off.

Shorter, more frequent cycles provide steadier temperatures, but if the cycle length is too short the difference in temperature between the NOx adsorber-catalyst and the SCR catalyst will reflect primarily heat loss to the surroundings with little effect from the damping of the temperature cycles. The cycle length is preferably about 120 seconds or less, more preferably about 60 seconds or less, more preferably about 30 seconds or less. The desulfation need not be a complete desulfation, but includes at least two cycles, preferably at least about 5. Consecutive cycles need not be identical.

The NOx adsorber-catalyst temperature is generally driven by the exhaust temperature upstream of the NOx adsorber-catalyst, as when the exhaust is heated by a reformer. The exhaust temperature does not need to vary smoothly over the cycles.

A device between the NOx adsorber-catalyst and the SCR, such as a DPF or the device 15, facilitates the implementation of this method, although in some systems this method may be implemented without such a device. Even without a device to provide thermal damping during desulfation, the SCR catalyst will experience temperatures that remain closer to the average exhaust temperature than the varying temperatures experienced by the NOx adsorber-catalyst.

Desulfation requires a reducing atmosphere. The exhaust may be made only slightly reducing, although a more strongly reducing exhaust may accelerate desulfation. Reducing conditions need not be maintained during the cooler parts of the desulfation temperature cycle where the NOx adsorber-catalyst is at too low a temperature for effective desulfation.

A typical desulfation according to the inventors' concept lasts from about 5 to about 60 minutes. A desulfation does not have to be so long that all of the sulfur that can be removed from the NOx adsorber-catalyst is removed, but is long enough to remove a substantial amount of sulfur. A substantial amount of sulfur is removed if the performance of the NOx adsorber-catalyst is measurably improved to a greater extent than can be explained by simple denitration.

A particulate filter can have any suitable configuration. Examples of suitable configurations include monolithic wall flow filters, which are typically made from ceramics, especially cordierite or SiC, blocks of ceramic foams, monolith-like structures of porous sintered metals or metal-foams, and wound, knit, or braided structures of temperature resistant fibers, such as ceramic or metallic fibers. Typical pore sizes for the filter elements are about 10 μm or less. Optionally, the NOx adsorber-catalyst 13 or the SCR catalyst 15 may be integrated as a coating on a DPF.

Figure 3:
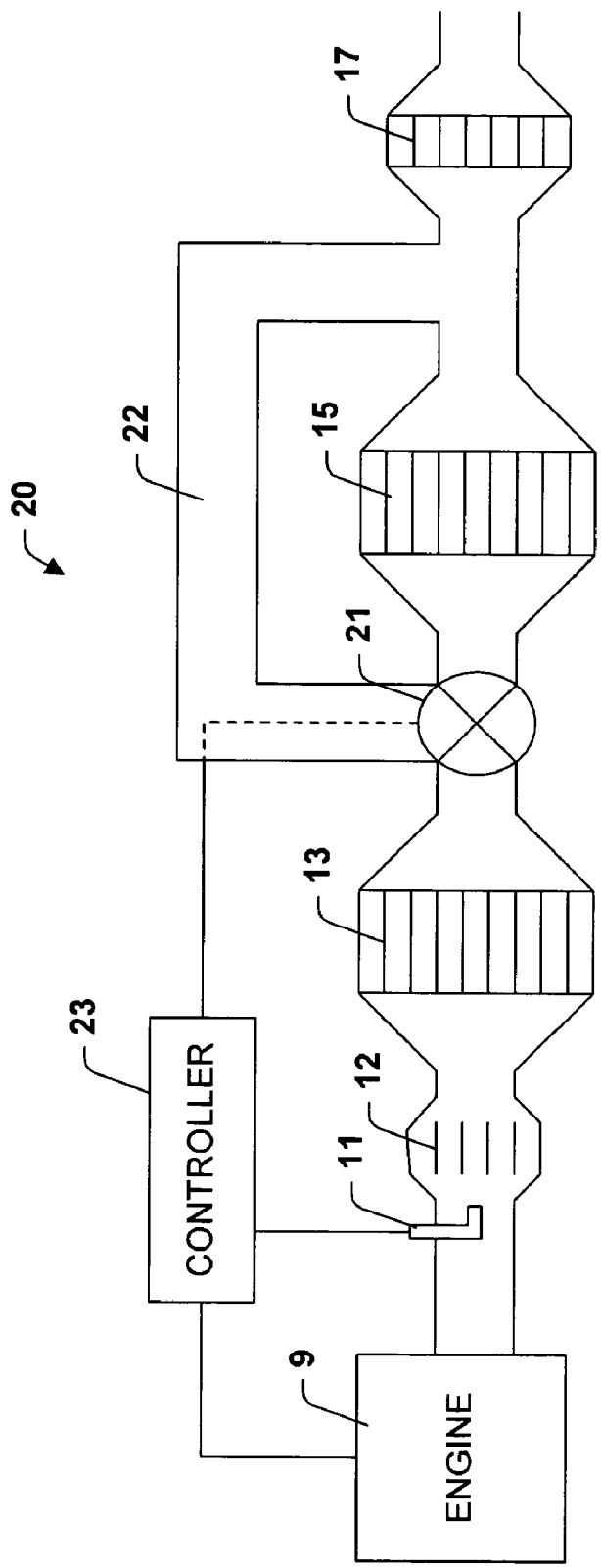
FIG. 3 is a schematic illustration of a second exemplary system to which various concepts of the inventors can be applied.

FIG. 3 illustrates another concept of the inventors for avoiding high temperatures in the SCR catalyst 15 during desulfation. The concept is illustrated by an exhaust aftertreatment system 20. The exhaust aftertreatment system 20 comprises the fuel injector 11, the reformer 12, the NOx adsorber-catalyst 13, and the SCR catalyst 15. In addition, the system 20 comprises a valve 21 for selectively diverting the exhaust from the SCR catalyst 15 into bypass 22. The bypass 22 rejoins the main exhaust channel downstream of the SCR catalyst 15, whereby the clean-up oxidation catalyst 17 can remain online whether or not the exhaust is being diverted around the SCR catalyst 15. The system 10 is operated by a controller 23, that may also be a control unit for the engine 9.

During routine operation, the valve 21 channels the exhaust from the NOx adsorber-catalyst 13 to the SCR catalyst 15. For desulfation, the controller 23 actuates the valve 21 to divert the exhaust from the SCR catalyst 15 to the bypass 22. Other means than valve 21 can be used to selectively divert the exhaust. A valve between the outlet of the SCR 15 and the point where bypass 22 rejoins the exhaust pipe can also be effective for diverting the exhaust. Instead of using a valve, the flow can be diverted with a stream of high pressure air, drawn from a turbocharger, for example.

The valve 21 can be controlled in any suitable fashion. In one embodiment, the valve 21 actuates to divert the exhaust flow when a temperature sensor exceeds a critical value. A suitable location for the temperature sensor would be on the NOx adsorber-catalyst 13 near its outlet. Optionally, the temperature sensor is one that is also used in controlling the temperature of the NOx adsorber-catalyst 13 during desulfation. In another embodiment, the valve 21 is actuated by the controller 23 to divert the exhaust flow from the SCR catalyst 15 from the beginning to the end of a desulfation process.

A flow diverter between the NOx adsorber-catalyst 13 and the SCR catalyst 15 can be useful for other purposes as well. For example, the NOx adsorber-catalyst 13 produces ammonia primarily toward the end of its denitration cycle. This ammonia can be captured by the SCR catalyst 15 for later use. The ammonia can be used to reduce NOx bypassing the NOx adsorber-catalyst 13 during lean operation; however, the ammonia may be most needed just before, or during, the subsequent denitration cycle. To preserve the ammonia, and in particular to avoid having the ammonia oxidized by exhaust components other than NOx, the flow diverter may be activated for a period immediately following a denitration process in which ammonia is generated.

The invention as delineated by the following claims has been shown and/or described in terms of certain concepts, components, and features. While a particular component or feature may have been disclosed herein with respect to only one of several concepts or examples or in both broad and narrow terms, the components or features in their broad or narrow conceptions may be combined with one or more other components or features in their broad or narrow conceptions wherein such a combination would be recognized as logical by one of ordinary skill in the art. Also, this one specification may describe more than one invention and the following claims do not necessarily encompass every concept, embodiment, or example described herein.

The invention claimed is:

1. An exhaust aftertreatment system, comprising:
    a NOx adsorber-catalyst configured to treat an exhaust flow;
    an SCR catalyst configured to adsorb ammonia released by the NOx adsorber-catalyst during denitration and to subsequently use the ammonia to reduce NOx in the exhaust;
    a particulate filter located upstream of the NOx adsorber-catalyst or downstream of the SCR catalyst; and
    means for preventing the SCR catalyst from becoming heated to near the same peak temperatures as the NOx adsorber-catalyst during desulfation of the NOx adsorber-catalyst, the means being disposed between the NOx adsorber-catalyst and the SCR catalyst;
    wherein the means comprises a flow diverter configured to prevent the exhaust leaving the NOx adsorber-catalyst from entering the SCR catalyst during desulfation of the NOx adsorber-catalyst.

2. A method of desulfating an NOx adsorber-catalyst in an exhaust aftertreatment system comprising an NOx adsorber-catalyst followed by an SCR catalyst, comprising:
    in a first step, providing a flow of gas heated to at least about 650° C. to the NOx adsorber-catalyst, wherein the flow of gas passes through the NOx adsorber-catalyst and then the SCR catalyst;
    maintaining the flow until a time after the NOx adsorber-catalyst has been heated by the gas to at least about 650° C., but terminating the flow before the SCR catalyst has reached a temperature of 550° C.;
    in a second step, providing a second flow of gas at a temperature of about 500° C. or less to the NOx adsorber-catalyst, wherein the second flow of gas passes through the NOx adsorber-catalyst and then the SCR catalyst;
    maintaining the second flow until a time after the NOx adsorber-catalyst has been cooled by the gas to a temperature at or below about 550° C.;
    repeating the first and second steps at least several times to complete the desulfation.

3. The method of claim 2, wherein there is a device between the NOx adsorber-catalyst and the SCR catalyst, the device having a substantial thermal mass in comparison to the SCR catalyst.

4. The method of claim 3, wherein the thermal mass is a particulate filter.

5. The method of claim 3, wherein exhaust aftertreatment system comprises a particulate filter either upstream of the NOx adsorber-catalyst or downstream of the SCR catalyst.

6. A method of desulfating an NOx adsorber-catalyst in an exhaust aftertreatment system comprising an NOx adsorber-catalyst followed by an SCR catalyst, comprising:
    cycling the temperature of the NOx adsorber-catalyst;
    creating a reducing environment in the NOx adsorber-catalyst during portions of the cycles where the NOx adsorber-catalyst is at temperatures effective for desulfation;
    wherein the cycles have peak temperatures in a range effective for desulfation and an average temperature that is at least 100° C. lower;
    wherein peak temperature reached by the SCR catalyst during the cycles is at least 100° C. lower than the peak temperature reached by the NOx adsorber-catalyst.

* * * * *